Patented Feb. 5, 1924.

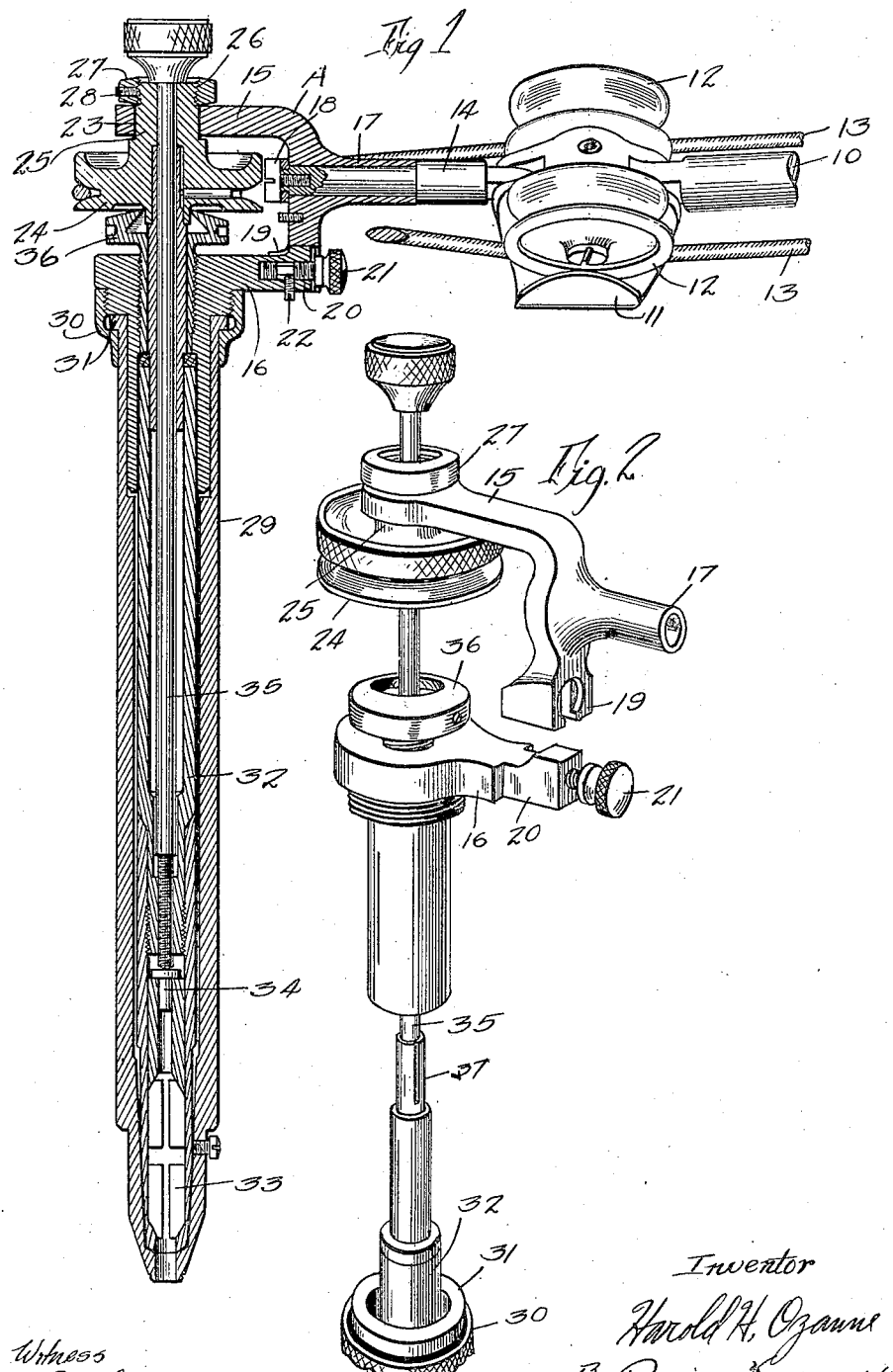

1,483,008

UNITED STATES PATENT OFFICE.

HAROLD H. OZANNE, OF EMMETSBURG, IOWA, ASSIGNOR OF ONE-THIRD TO LEONARD VAUGHAN AND ONE-THIRD TO LAURENS D. POTTER, BOTH OF EMMETSBURG, IOWA.

DENTAL HANDPIECE FOR DRILLS.

Application filed September 17, 1923. Serial No. 663,093.

*To all whom it may concern:*

Be it known that I, HAROLD H. OZANNE, a citizen of the United States, and a resident of Emmetsburg, in the county of Palo Alto and State of Iowa, have invented a certain new and useful Dental Handpiece for Drills, of which the following is a specification.

The object of my invention is to provide a dental hand piece for drills wherein the parts may be easily disassembled for permitting the same to be properly sterilized.

More particularly, my invention relates to a dental hand piece frame, which is composed of two parts and so arranged that the pulley wheel for driving the drill mechanism of the hand piece may be left in engagement with the drive belt when the remainder of the parts are disassembled for permitting them to be sterilized.

Still a further object is to provide a two-part frame capable of being locked together for holding the complete hand piece as well as the pulley for driving the drill mechanism thereof.

Still a further object is to provide a novel arrangement for the mounting of the pulley wheel in such a manner that it can be easily and quickly separated from the rest of the hand piece when necessary with a minimum amount of inconvenience.

With these and other objects in view, my invention consists in the construction, arrangement and combination of the various parts of my device whereby the objects contemplated are attained, as hereinafter more fully set forth, pointed out in my claims, and illustrated in the accompanying drawings, in which:

Figure 1 is a sectional view taken through my improved hand piece for use in connection with dental drills; and Figure 2 is a perspective view of the two-part frame showing the same as separated.

In the accompanying drawings, I have used the reference numeral 10 to indicate generally a supporting frame, which has fixed to it a pulley frame 11, having the pulley wheels 12 mounted thereon.

A drive belt 13 driven by any suitable power extends around the pulley wheels 12.

A short rod 14 is employed for connecting the dental hand piece frame proper to the pulley wheel frame 11.

My device consists of a two-part frame A. The upper part of the frame A is referred to by the reference numeral 15 and the lower part by the reference numeral 16.

The upper part 15 is provided with a long bearing 17 into which is extended the short rod 14. The inner end of the rod 14 has fixed to it a lock screw 18.

From the construction of the parts just described, it will be seen that the frame A is securely fixed to the pulley wheel frame 11.

The lower end of the upper part 15 of the frame A is bifurcated as at 19. The lower part 16 of the frame A is formed with a shank 20 which is received by the bifurcated portion 19 of the part 15.

A lock screw 21 is mounted in the shank 20 and is designed to engage the bifurcated portion 19 for positively locking the two parts 15 and 16 together for forming a complete frame A.

A short screw 22 is mounted in the under side of the shank 20 and is designed to engage the lock screw 21 on a contracted portion thereof for limiting the movement of the lock screw 21 and preventing it from being removed from the shank 20.

The upper frame part 15 is formed with an opening 23 which serves as a bearing for the pulley wheel 24. The pulley wheel 24 is provided with a hub 25 which extends through the opening 23.

The upper end of the hub 25 is screw-threaded as at 26, so that a locking collar 27, which is centrally screw-threaded, may be screwed onto the screw-threaded portion 26.

A set screw 28 holds the collar 27 in proper position. The drive belt 13 extends around the pulley wheel 24 for rotating the same.

When sterilizing the dental hand piece, it is not necessary to disconnect the pulley wheel 24 from the frame part 15.

A hand piece casing 29 is secured to the under side of the lower frame part 16 by means of a union nut 30. The upper edge of the hand piece casing 29 is formed with an out-turned flange 31, which is engaged by the union nut 30.

The frame part 16 is formed with a screw-threaded portion which coacts with the union nut 30 as clearly shown in Figure 1 of the drawings.

Mounted within the hand piece casing 29 is a spindle 32, a chuck 33, a plunger tip 34, and a chuck rod 35. The parts just described are of the ordinary construction used in connection with dental hand pieces for drills.

A suitable means is provided for connecting the drive pulley 24 to the shaft 37, either of the groove construction or a flattened surface, which fits into a similar construction in the hub of the pulley 24.

When it is desired to disassemble the parts for sterilizing them, all that is necessary is to remove the chuck rod 35 by engaging the knurled head 37 thereof until the lower end of the chuck rod, which is screw-threaded, is disengaged from the screw-threaded opening in the spindle 32.

The chuck rod 35 is then withdrawn and the union nut 30 is then disconnected.

The dental hand piece together with the spindle, plunger tip and chuck may then be removed.

The lock screw 21 may be loosened for permitting the frame part 16 to be operated from the remainder of the frame part 15 and in that way the drill mechanism may be withdrawn from the casing 29.

It will be seen that even though the drill mechanism, the casing, 29, and the frame part 16 are removed from the remainder of the device, yet the pulley wheel 24 will remain in engagement with the drive belt 13.

The advantage of my construction resides in the fact that I am able to properly and quickly disconnect and disassemble all the parts of the device with the exception of the pulley wheel and the frame part 15 for permitting them to be properly sterilized.

This disassembling of the device in the convenient manner just described is permitted due to the arrangement of the two part frame A.

With the device heretofore used, it has been almost impossible to properly sterilize the interior of the hand piece casing and the mechanism therein, due to the fact that it was necessary to disconnect the drive belt therefrom, the result being that most dentists would not take the trouble to do the same.

Some changes may be made in the construction and arrangement of the various parts of my device without departing from the essential features and purposes of my invention, and it is my intention to cover by my claims, any modified forms of structure or use of mechanical equivalents, which may be reasonably included within their scope.

I claim as my invention:

1. A dental hand piece for drills comprising a hand piece casing, a frame, means for detachably connecting the casing to the frame, a pulley wheel mounted in said frame, said frame comprising an upper and lower part demountably connected together, said pulley wheel being journalled in the upper part of the frame for permitting the parts of the hand piece to be disassembled without disconnecting the pulley wheel from its belt.

2. A dental hand piece for drills comprising a hand piece casing, a frame, means for detachably connecting the casing to the frame, a pulley wheel mounted in said frame, said frame comprising an upper and lower part demountably connected together, one part of the frame being bifurcated and the other part having a shank adapted to extend into the bifurcated portion, said pulley wheel being journalled in the upper part of the frame for permitting the parts of the hand piece to be disassembled without disconnecting the pulley wheel from its belt.

3. A dental hand piece for drills comprising a hand piece casing, a frame, means for detachably connecting the casing to the frame, a pulley wheel mounted in said frame, said frame comprising an upper and lower part demountably connected together, one part of the frame being bifurcated and the other part having a shank adapted to extend into the bifurcated portion, a lock screw on said shank for engaging the bifurcated portion, said pulley wheel being journalled in the upper part of the frame for permitting the parts of the hand piece to be disassembled without disconnecting the pulley wheel from its belt.

4. A dental hand piece for drills comprising a hand piece casing, a frame, a supporting frame, means for connecting said frame to the supporting frame, means for detachably connecting the hand piece casing to said frame, said frame comprising an upper and lower part, the upper part being secured to the supporting frame and the lower part to the hand piece casing, means for locking the two parts of the frame together, a pulley wheel journalled in the upper part of the frame wherein the parts of the hand piece may be disassembled without disconnecting the drive belt from the pulley or upper part of the frame from said supporting frame as and for the purposes stated.

5. A dental hand piece frame for supporting a pulley wheel comprising an upper and lower part, means for connecting and holding the parts together, a pulley wheel mounted in the upper part, a hand piece casing and drill mechanism mounted on the lower part, a chuck screw rod for connecting the pulley wheel to the drill mechanism, the parts being so arranged that the releasing of the chuck screw rod and the separation of the upper and lower parts of the frame will permit all the parts to be disassembled leaving the pulley wheel secured to the upper part of the frame.

HAROLD H. OZANNE.